J. AUGSPURGER.
Stalk-Chopper.
No. 18,076.
Patented Sept. 1, 1857.
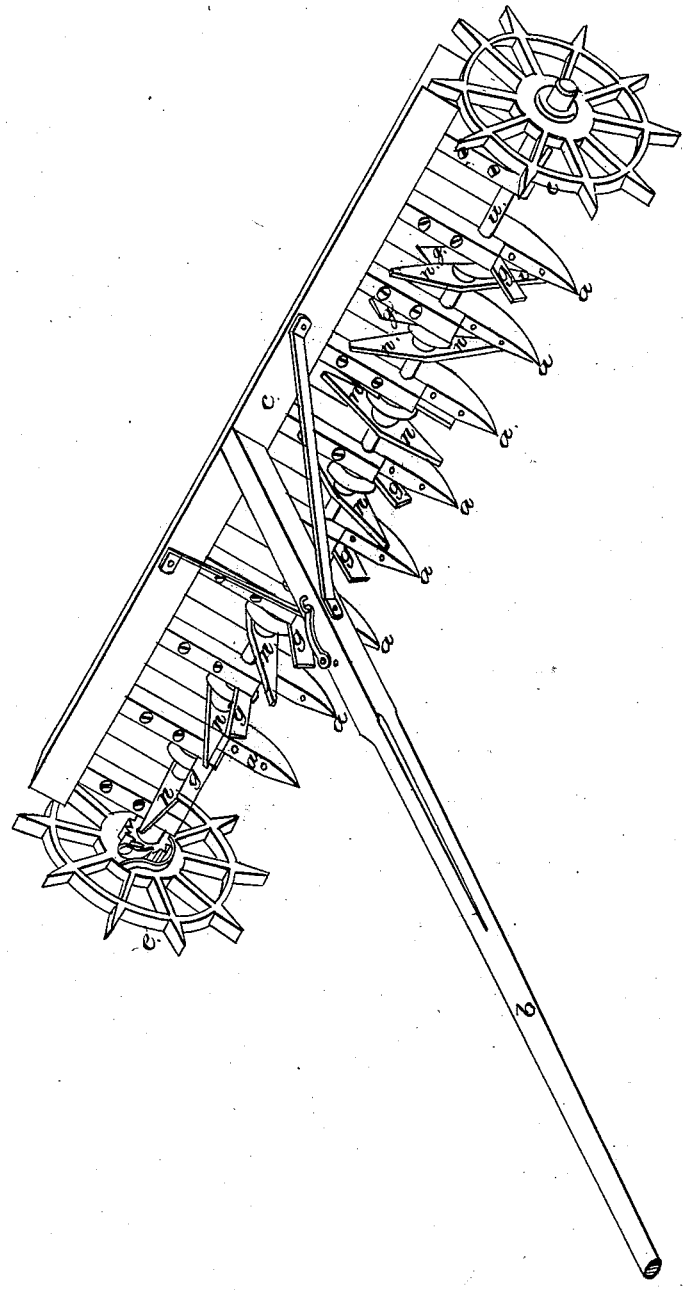

UNITED STATES PATENT OFFICE.

JOHN AUGSPURGER, OF TRENTON, OHIO.

IMPROVEMENT IN MACHINES FOR CUTTING CORN-STUBBLE, &c., ON GROUND PREPARATORY TO PLOWING.

Specification forming part of Letters Patent No. 18,076, dated September 1, 1857.

*To all whom it may concern:*

Be it known that I, JOHN AUGSPURGER, of Trenton, Butler county, Ohio, have invented a new and useful Machine for Cutting Lying Cornstalks; and I hereby declare the following to be a full and exact description thereof, reference being had to the accompanying drawing, making part of this specification.

The object of my invention is a provision for cutting to pieces cornstalks and like matters which lie on the ground; and this I accomplish by the attachment to a rake supported on wheels of a series of knives, which, rotating with the axle, are made to cut shearwise with the teeth of the rake, and by this means to sever the stalks, &c., which gather upon the teeth as the machine is drawn forward.

In the accompanying perspective view of the machine, *a a a* are a set of rake-teeth, having a tongue, *b*, projecting at such an angle from the beam or stock *c* as when hitched to the team to present the teeth at an angle of about fifty degrees with the horizon.

*e e* are two ground-wheels, attached to the shaft *d*, which, being journaled to the teeth *a*, so supports them as to permit their points barely to graze the ground. The ground-wheels *e e* are connected with the shaft *d* by means of the customary ratchet movement *f* in such manner that when the machine is drawn forward the rotation of the wheels is imparted to the shaft, but on a change of course the halting wheel is left free to turn backward or slowly forward or to remain quiescent, while the advancing wheel continues to rotate the shaft.

*g g g* are a series of blades attached to the shaft *d* by means of hubs or collars in such manner that one, two, three, or more will cut shearwise with each tooth, and so arranged spirally on the shaft as that no two successive blades will be in full operation at the same time.

The shearing-edges of the teeth may be suitably faced with steel, and those of the blades may have the convex outline common to many shearing-instruments.

Attached to the shaft *d*, midway between the teeth and immediately following the blades *g*, are sweeps *h h h*, which serve by their rotation to remove any cornstalks or other trash which might otherwise clog the teeth.

Not cornstalks alone, but weeds, straw, briers, &c., are by the action of this machine so cut to pieces as no longer to interfere with the tillage of the ground or damage a young crop by being carried forward by a plow or cultivator.

The best time to use the machine is found to be during dry weather, when the stalks are brash.

The machine constructed and used by me contains eight teeth, placed eight inches apart, and completely cuts to pieces ten to fifteen acres of the heaviest class of cornstalks in a day. The work is easily performed by two horses, and I believe that with an ordinary or light class of corn a single horse would suffice.

I claim as new and of my invention herein—

The described or substantially equivalent combination, with the teeth of a rake, of rotating knives, for the purpose set forth.

In testimony of which invention I hereunto set my hand.

JOHN AUGSPURGER.

Witnesses:
GEO. H. KNIGHT,
JAS. H. GRIDLEY.